United States Patent
Van Valkenburg

(10) Patent No.: US 8,336,182 B2
(45) Date of Patent: Dec. 25, 2012

(54) DEVICE AND METHOD FOR HOLDING A TOOL BIT

(76) Inventor: Sjoerd Anne Van Valkenburg, The Hague (NL)

( * ) Notice: Subject to any disclaimer, the term of this patent is extended or adjusted under 35 U.S.C. 154(b) by 974 days.

(21) Appl. No.: 12/393,340

(22) Filed: Feb. 26, 2009

(65) Prior Publication Data

US 2009/0212507 A1   Aug. 27, 2009

Related U.S. Application Data

(60) Provisional application No. 61/031,421, filed on Feb. 26, 2008.

(51) Int. Cl.
*B23P 19/00* (2006.01)
*B23Q 7/00* (2006.01)
*B25B 27/14* (2006.01)

(52) U.S. Cl. ............ 29/426.1; 29/426.5; 29/426.6; 29/559; 29/700; 29/281.1; 29/428; 408/239 R; 408/240

(58) Field of Classification Search ............ 29/426.1, 29/426.5, 426.6, 700, 243, 281.1, 283, 464, 29/428, 559; 408/239 R, 240, 239 A
See application file for complete search history.

(56) References Cited

U.S. PATENT DOCUMENTS

| | | | | |
|---|---|---|---|---|
| 1,970,016 A | * | 8/1934 | Morton | 407/87 |
| 2,911,707 A | * | 11/1959 | Almen | 407/3 |
| 3,066,385 A | * | 12/1962 | Vana | 407/110 |
| 4,080,854 A | * | 3/1978 | Peterson | 82/158 |
| 6,276,047 B1 | * | 8/2001 | Webster et al. | 29/559 |
| 7,722,608 B2 | * | 5/2010 | Steiner et al. | 606/53 |
| 7,780,668 B2 | * | 8/2010 | Steiner et al. | 606/79 |
| 2008/0215052 A1 | * | 9/2008 | Steiner et al. | 606/53 |
| 2008/0255623 A1 | * | 10/2008 | Steiner et al. | 606/86 R |

* cited by examiner

*Primary Examiner* — Essama Omgba
(74) *Attorney, Agent, or Firm* — Sand & Sebolt

(57) ABSTRACT

A device for holding a bit for a tool, the bit to be disassembled and/or re-assembled when held, includes a housing to be secured to a stationary base and a clamping mechanism for releasably clamping the bit to the housing so that it may be disassembled and/or re-assembled, the clamping mechanism including a recess provided in the housing, a movable gripping element arranged inside the recess and having a first gripping area for engaging the bit part, and a stationary gripping element, the gripping element having a second gripping area for engaging a bit part, wherein the movable gripping element is configured to be moved between an open position wherein the stationary gripping element and the movable gripping element are spaced to allow to receive or to remove the bit part and a clamping position wherein the bit part is clamped between first and second gripping areas of the gripping elements.

21 Claims, 2 Drawing Sheets

DEVICE AND METHOD FOR HOLDING A TOOL BIT

BACKGROUND OF THE INVENTION

1. Field of the Invention

The present invention relates to a system and device for holding a bit for a tool, the bit to be disassembled and/or re-assembled when held. The invention also relates to a method of disassembling and/or re-assembling the bit.

2. Description of the Related Art

A router is a tool, especially used in the woodworking industry, used for milling out (hollow out) an area in the face of a piece of material (workpiece). Usually the material is wood or metal, but applying the router to other types of materials is also possible. There are several types of routers. Nowadays, most common types are spindle type routers (spindle routers), where a router bit is mounted onto a rotatable spindle of an electric motor.

A typical router set-up includes a frame for supporting the router table. The piece of material to be machined is supported by the table. Also the router is mounted to the support table. The table has an opening through which a bit protrudes for machining the material. Different bit sizes and shapes can be used, and the bit is easily exchangeable. The bit is engaged by a collet provided with a clamping mechanism including a number of clamps or jaws. The collet is part of a rotatable spindle that is connected to a motor drive for rotation. The router collet (and router bit mounted in the mouth of the collet) can be rotated around an axis perpendicular to the router table. Sometimes the collet may be able to move with respect to the table, for example, along the axis of rotation by a depth adjustment tool. In this case, the shape of the cut that is created is determined by the size and shape of the bit (cutter) held in the collet and the height of the bit relative to the upper surface of the router table.

One of the important variables determining the router's work is the shape of the router bit (the cutter). A large variety of different router bit shapes is on the market nowadays, allowing an almost indefinite shape to be routed to the workpiece. A part of the router bits is formed by the so-called stacked router bits. Typically, a stacked router bits consist of a central shaft (the shank, usually ½ inch diameter, but other diameters are possible as well), with a threaded top end on which are mounted one or more removable bit elements, including (but not limited to) disc shaped cutters, (ball) bearings for guidance and/or various shims or spacers. To keep the stack of bit elements cutters and spacers firmly on the shank, an end nut or similar device is tightened on top of the shank.

Adding or removing bit elements such as spacers or shims in between other bit elements such as the cutters may be required to modify the thickness of wood removed in the routing process or the depth of cut in case of a ball bearing diameter change. Cutters may have to be substituted by other cutters, for instance differently shaped cutters, or by other types of bit elements. The operation of loosening the nut, removing the bit elements, replacing them, if needed, by other bit elements and re-tightening the nut on the shank is generally done with the router bit mounted in the router machine itself, more specifically in the router collet.

The operation of disassembling and/or re-assembling stacked router bits while keeping the router bits chucked into the router is cumbersome for various reasons. First of all, unless the router itself is securely held, for instance in a base element such as a router table, the router, in turn, will require to be secured to prevent it from turning when applying torque to unscrew or refasten the end nut. This can be done if the router is held in the router table, but that prevents the router table to be set up for alternative operations. Moreover, when the operation is performed in case the stacked router bit is clamped by the collet of the router, small parts, such as spacers, washers etc. may fall into the router motor housing. Furthermore, during the time interval wherein the router bit is chucked in the router collet for disassembling or re-assembling it, the router cannot be used for other purposes, such as milling another workpiece. A further drawback is that the visibility is less than ideal, because the router collet generally cannot protrude far enough above the router table to allow a full and unencumbered view of the operation.

Alternatively, the stacked router bits could be held by a clamping element such as a hand plier or a steel bench vise. Generally, however, these clamping elements are less capable of resisting the considerable torque, required to unscrew and re-fasten the end nut. Besides, these clamping elements would engage directly on the router bit shank in such a manner that the risk is present to destroy the integrity of the bit and to render it useless or even dangerous for further usage. Consequently, there is currently no method to hold the router bit successfully other than in the router collet itself.

SUMMARY OF THE INVENTION

An object of the present invention is to provide a good device, system and method for disassembling and/or re-assembling a tool bit.

It is further object of the invention to provide a system and device wherein at least one of the disadvantages of the prior art has been reduced or even removed.

It is another object of the present invention to provide a device that is easily transportable, has a simple construction, and/or is designed to avoid any damage to the tool bit during the disassembling and reassembling process.

The present invention, in part, relates in a first aspect to a device for holding a bit for a tool, especially a stacked router bit for a router, the bit to be disassembled and/or re-assembled when held, the device comprising a housing to be secured to a stationary base and a clamping mechanism for releasably clamping the bit to the housing so that it may be disassembled and/or re-assembled, the clamping mechanism comprising:
  a recess provided in the housing;
  a movable gripping element arranged inside the recess and having a first gripping area for engaging the bit part;
  a stationary gripping element, the gripping element having a second gripping area for engaging a bit part;
  wherein the movable gripping element is configured to be moved between an open position wherein the stationary gripping element and the movable gripping element are spaced to allow to receive or to remove the bit part and a clamping position wherein the bit part is clamped between first and second gripping areas of the gripping elements.

The device may hold the bit, for instance the shank of a stacked router bit, tightly and securely. The device holds the router bit sufficiently tight to avoid it spinning when applying the required torque to loosen or tighten the end nut of stacked router bits. The device is also configured to avoid structural or surface damage to the router bit shank. With the help of the device, the disassembly (and reassembly) operation can now be performed independently of the tool, fir instance a router machine.

In an embodiment the movable gripping element is rotatably arranged in the recess of the housing, so that a relatively large clamping force may be generated for holding the tool bit.

In a further embodiment the movable gripping element articulates at one end in a rounded end portion of the recess. A separate (and potentially vulnerable) rotation axle can be dispensed with and it is the shape (and dimensions) of the recess of the housing that enables the rotational movement of the movable gripping element. More specifically, in another embodiment both the movable gripping element and the recess have a rounded end portions so that the end portion of the gripping element may be rotated smoothly n the end portion of the recess.

In further embodiments the movable gripping element is a rotatable lever and the gripping area is arranged close to the free end of the lever, so that a relatively large clamping force may be exerted on the tool bit.

The clamping force is caused by a tightening element extending through the movable gripping element and being attached to a housing part, for instance a steel end plate abutting a side of the housing. Operation of the tightening element, for instance a threaded bolt or screw, may cause the movable gripping element to move towards or away from the stationary gripping element thereby respectively clamping or releasing the tool bit.

In some embodiments the gripping areas are shaped so as to more or less conform with the shape of the bit part. When the gripping areas clamp the tool bit, the risk of damaging the bit is further reduced. In a further embodiment the first gripping area and the second gripping area are shaped to define between the areas a substantially cylindrical space for holding the substantially cylindrical bit part, for instance the outer end of the shank of the router bit.

According to another aspect, the present invention relates to a method of disassembling and/or re-assembling a bit for a tool, especially a stacked router bit for a router, the method comprising:

removing the bit from the tool;
placing the bit in the device as herein defined;
securing the bit to the device;
disassembling and/or re-assembling the bit, when the bit is in secured condition;
releasing the bit from the device;
placing the released bit in the tool.

The system according to the present invention may include a router, a router table, a router fence, one or more stacked router bits and/or the device as described herein. The device may be integrated with the system, but generally will be a separate part. This allows the device to be stored easily.

BRIEF DESCRIPTION OF THE DRAWINGS

Embodiments of the invention will now be described by way of example only, with reference to the accompanying drawings, wherein.

DETAILED DESCRIPTION

The following detailed description of embodiments of the present invention will be better understood when read in conjunction with the appended drawings wherein like references indicate similar elements.

Figure 1:
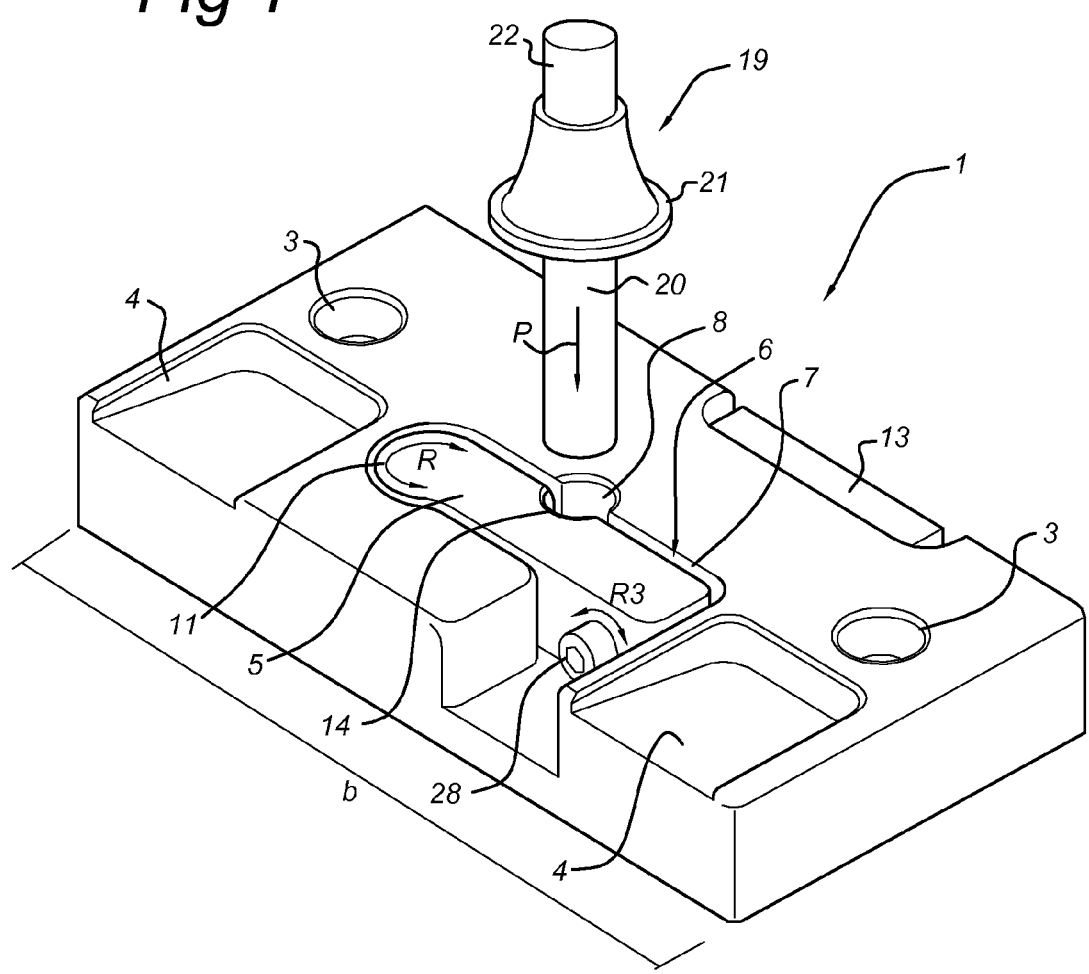
FIG. 1 shows a perspective view of an embodiment of a device for holding a first tool bit.
Figure 3:
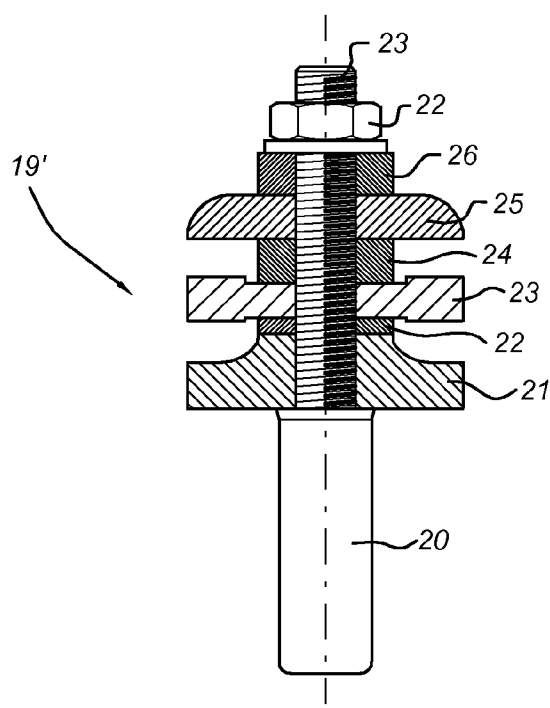
FIG. 3 shows a cross-section of a second embodiment of a stacked router bit.

FIG. 1 shows an embodiment of a device for holding a tool bit 19, especially a stacked router bit 19', while the tool bit is disassembled and/or reassembled. Generally, the tool bit 19 comprises a shaft or shank 20, at least one cutter 21 and a closing element 22, for instance a nut threaded onto the threaded end 23 of the shank 20. FIG. 3 gives an example of a special tool bit that may be used in a router. The tool bit is a stacked router bit 19', comprising a shank 20 on which a number of bit elements 21-26 have been arranged. The bit elements are secured to the shaft by the nut 22 The bit element may include (but is not limited by) several cutters 21, 25, several spacers 22,24,26 and a ball bearing 23 or any other suitable sequence of router bit elements, as will be appreciated by the skilled person in the art of woodworking.

The embodiment of device 1 functions as a bit vise and includes a body 2 (preferably made of aluminium, other suitable materials may be used instead), in this specific embodiment with outer dimensions of about 17% cm long, 8 cm wide and 3 cm high (these dimensions are not critical to the design). The device 1 can be safely and securely fixed on any work surface of a base (b), for instance a router table or a work bench. To this end, two through-holes 3 have been drilled into the body 2. The body 2 may then be fixed to the base (b) by inserting fasteners, including (but not limited to) screws (not shown) into the through-holes 3 and screwing the body 2 to the base (b). Alternatively, the base may be formed by a piece of material, for instance a piece of wood that is attached underneath the body 2. This piece of material may be used to allow temporary holding of the device 1 in a bench vise of the workbench. There are several other ways the device can be mounted, allowing easy access as well as ample visibility in relation to the tool bit being assembled.

The body 2 is provided with an elongated recess 9 in which a clamping element 5, herein also referred to as the lever, may be rotatably arranged. The clamping element is preferably made of metal (for instance steel), although other high strength materials may be applied as well. The shape of the recess 9 essentially corresponds to the shape of the lever, but a certain amount of play is present between the lever 5 and the sidewall 7 of the recess 9. The space 6 present at one side of the lever 5 allows a tool bit to be arranged between the lever and the side wall, as will be explained hereafter.

The side wall 7 of the recess is provided with a first engaging area 8 for engaging a tool bit 19. At a similar location the side wall of the lever 5 is provided with a second engaging area 14. Both engaging areas 8,14 form a (preferably blind) hole 15 for receiving and accommodating the tool bit. In the embodiment the hole 15 is arranged in or near the centre of the body 2, so that the forces exerted on tool bit and passed to the body are distributed evenly across the body. In other embodiments the hole may be situated at other locations, for instance close to a corner of the body. Furthermore, in the embodiment of FIGS. 1 and 2, the engaging areas 8,14 are shaped so as to form, in cross-section, essentially two semi-circles. This shape of the side walls of the body 2 and the lever 5 ensures that the hole 15 may form an essentially cylindrical hole. The size of the hole 15 depends on the size of the tool bit to be accommodated. Generally, router bit shanks have a diameter of about 0.5 inch. The cylindrical hole then has a similar diameter (D=0.5 inch), fitting the shank of the router bit.

The lever 5 has one end 11 having a generally rounded shape that fits in the generally rounded shape of an end 18 of the recess 9 in such a way, that the lever 5 may be rotated (in directions R, cf. FIGS. 1-2) with respect to the rounded end 18 of the recess. The lever 5 may be rotated without needing a (mechanical) rotation axle. The torque that can be exerted on the lever 5 without damaging the lever and/or body is extremely high.

The lever 5 articulates on one side 11 in the rounded recess 18 and may be tightened on the opposite side by a bolt or screw 28 or a similar device. The screw 28 (preferably a steel screw) has an external thread and passes through a hole in the lever 5 and the body 2 so as attach it to a steel end plate 13.

In operation, the lever 11 is positioned to provide sufficient space between the engaging areas 8,14 that the shank 20 of the tool bit 19 may be lowered (direction P) into the opening 15. Once the shank 20 has been lowered into the hole and rests on the bottom of the hole (in case hole 15 is a blind hole) or on the upper surface of the base (b) (in case the hole 15 is a through-hole), the lever 5 may be pushed against the shank in order to clamp the shank firmly between the side wall of the lever and the side wall 7 of the body.

More specifically, by rotating screw 28 in the suitable direction ($R_3$ in FIG. 1), the lever 5 may be rotated counter-clockwise (direction $R_1$, cf. FIG. 2) so that the space 6 between the side wall 7 of the body 2 and the side wall of the lever 5 is decreased, causing the engaging area 14 to approach the engaging area 8. This brings about a clamping force on the shank 20 of the tool bit 19 that has been lowered into space 6 between the engaging areas 8, 14. The clamping force is sufficiently large to enable a proper disassembling and possibly reassembling the stacked tool bit. The construction makes it possible to hold the shank 20 of the bit 19 tightly and securely and without causing structural or surface damage to its shank.

Afterwards the shank of the tool bit can be released from the device by rotating screw 28 in the opposite direction. The lever may be rotated clockwise (direction $R_2$, cf. FIG. 2) in order to enlarge distance between the engaging areas 8,14 of the body and lever respectively. This causes the shank 20 of the tool bit 19 to be released so that it can be taken out if the hole 15 of the device.

Figure 2:
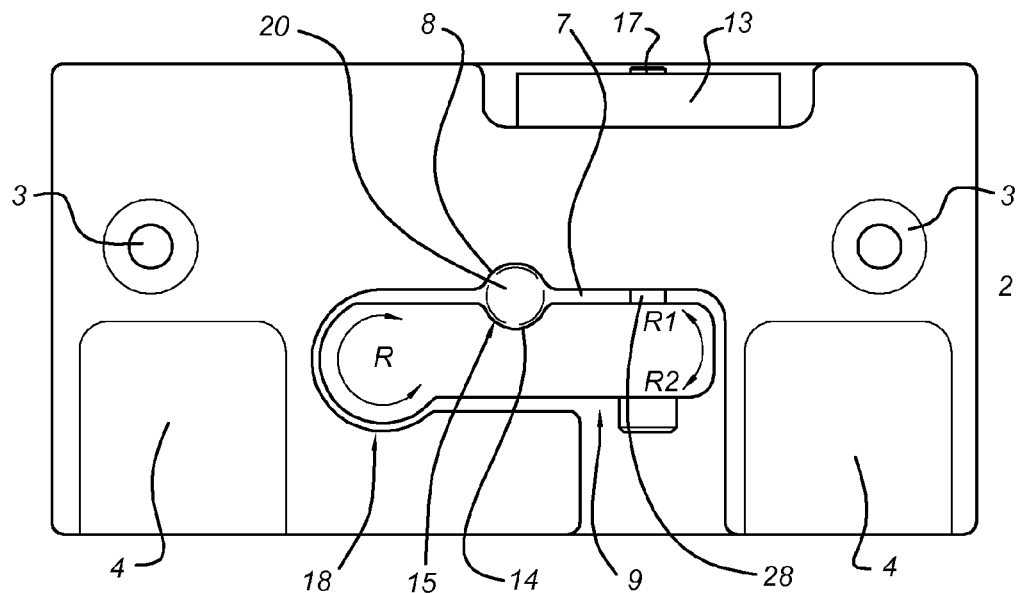
FIG. 2 shows a top view of the embodiment of FIG. 1, without the tool bit.

In the embodiment shown in FIGS. 1 and 2 the body 2 has, on either side of the central hole 15, two recesses 4 for storing various spare parts, with sloped bottoms for easy retrieval of those parts. In other embodiments the recesses are dispensed with or a different construction is used for storing the spare parts.

Although the invention has been described with reference to specific embodiments thereof, it will be appreciated that invention is not limited to these embodiments and that changes and modifications to the system and method described herein may be made without departing from the invention. The rights applied for are defined by the following claims.

The invention claimed is:

1. A device for holding a bit for a tool, where the bit is to be disassembled and/or re-assembled when held thereby, wherein the device comprises:
    a housing to be secured to a stationary base; and
    a clamping mechanism adapted to releasably clamp the bit to the housing so that it may be disassembled and/or re-assembled, the clamping mechanism comprising:
        a recess provided in the housing;
        a movable gripping element is rotatably arranged in the recess of the housing and having a first gripping area for engaging a bit part;
        a stationary gripping element, the gripping element having a second gripping area for engaging the bit part;
        wherein the movable gripping element is configured to be moved between an open position wherein the first and second gripping areas of the movable gripping element and the stationary gripping element are spaced to allow to receive or to remove the bit part, and a clamping position wherein the first and second gripping areas are spaced to clamp the bit part therebetween.

2. The device as claimed in claim 1, wherein the stationary gripping element is formed by at least a part of the side wall of the recess.

3. The device as claimed in claim 1, wherein the movable gripping element articulates at one end in a rounded end portion of the recess.

4. The device as claimed in claim 1, wherein both the movable gripping element and the recess each have a rounded end portion so that the rounded end portion of the gripping element may be rotated in the rounded end portion of the recess.

5. The device as claimed in claim 1, further comprising a tightening element for moving the movable gripping element relative to the stationary gripping element.

6. The device as claimed in claim 5, wherein the tightening element extends through the movable gripping element and is attached to a housing part.

7. The device as claimed in claim 1, wherein the first and second gripping areas are shaped so as to conform with the shape of the bit part.

8. The device as claimed in claim 7, wherein the first gripping area and the second gripping area are shaped to define between them a substantially cylindrical space for holding the substantially cylindrical bit part.

9. The device as claimed in claim 1, wherein the housing is provided with at least one through-hole for receiving a fastener so as to fasten the housing to the stationary base.

10. The device as claimed in claim 1, wherein the stationary base is a router table.

11. A system comprising a device as claimed in claim 1 and at least one stacked router bit, the bit comprising a shank provided with a plurality of stacked bit elements to be disassembled and/or re-assembled when the bit is clamped in said device.

12. A method of disassembling and/or re-assembling a bit for a tool, the method comprising:
    removing the bit from the tool;
    placing the bit in a device as claimed in claim 1;
    securing the bit to the device;
    disassembling and/or re-assembling the bit, when the bit is in secured condition;
    releasing the bit from the device;
    placing the released bit in the tool.

13. The device as claimed in claim 1, wherein the movable gripping element is a rotatable lever and wherein the first gripping area is arranged close to a free end of the lever.

14. A device, for holding a bit for a tool, where the bit is to be disassembled and/or re-assembled when held, wherein the device comprises:
    a housing to be secured to a stationary base; and
    a clamping mechanism adapted to releasably clamp the bit to the housing so that it may be disassembled and/or re-assembled, the clamping mechanism comprising:
        a recess provided in the housing;
        a movable gripping element arranged inside the recess and having a first gripping area for engaging a bit part; wherein the movable gripping element is a rotatable lever and wherein the first gripping area is arranged close to a free end of the lever;
        a stationary gripping element, the gripping element having a second gripping area for engaging the bit part;
        wherein the movable gripping element is configured to be moved between an open position wherein the first and second gripping areas of the movable gripping element and the stationary gripping element are spaced to allow to receive or to remove the bit part, and a clamping position wherein the first and second gripping areas are spaced to clamp the bit part therebetween.

15. The device as claimed in claim 14, further comprising a tightening element for moving the movable gripping element relative to the stationary gripping element.

16. The device as claimed in claim 15, wherein the tightening element extends through the movable gripping element and is attached to a housing part.

17. The device as claimed in claim 14, wherein the first and second gripping areas are shaped to be complementary to the shape of a shaft of the bit part.

18. The device as claimed in claim 14, wherein the stationary gripping element is formed by at least a part of the side wall of the recess.

19. The device as claimed in claim 14, wherein the housing is provided with at least one through-hole for receiving a fastener so as to fasten the housing to the stationary base.

20. A method of disassembling and/or re-assembling a bit for a tool, the method comprising the steps of:
    removing the bit from the tool;
    placing the bit in a device as claimed in claim 14;
    securing the bit to the device;
    disassembling and/or re-assembling the bit, when the bit is in secured condition;
    releasing the bit from the device; and
    placing the released bit in the tool.

21. A device for holding a bit for a tool comprising:
    a housing to be secured to a stationary base; and
    a clamping mechanism adapted to releasably clamp the bit to the housing, the clamping mechanism comprising:
        a recess provided in the housing;
        a movable gripping element rotatably arranged in the recess of the housing and having a first gripping area for engaging a bit part;
        a stationary gripping element, the gripping element having a second gripping area for engaging the bit part;
    wherein the movable gripping element is configured to be moved between an open position wherein the first and second gripping areas of the movable gripping element and the stationary gripping element are spaced to allow to receive or to remove the bit part, and a clamping position wherein the first and second gripping areas are spaced to clamp the bit part therebetween.

* * * * *

UNITED STATES PATENT AND TRADEMARK OFFICE
CERTIFICATE OF CORRECTION

PATENT NO. : 8,336,182 B2
APPLICATION NO. : 12/393340
DATED : December 25, 2012
INVENTOR(S) : Sjoerd Anne van Valkenburg It is certified that error appears in the above-identified patent and that said Letters Patent is hereby corrected as shown below:

Column 5, line 58 (Claim 1) "a movable gripping element is rotatably arranged" should be changed to --a movable gripping element rotatably arranged--

Signed and Sealed this
Nineteenth Day of February, 2013

Teresa Stanek Rea
*Acting Director of the United States Patent and Trademark Office*